United States Patent Office 3,390,110
Patented June 25, 1968

3,390,110
PROCESS FOR THE PREPARATION OF MODIFIED ALKYD RESINS AND RESULTING PRODUCT
Horst Dalibor, Harksheide, near Hamburg, Germany, assignor to Reichhold Chemicals, Inc., White Plains, N.Y.
No Drawing. Filed June 23, 1964, Ser. No. 377,403
Claims priority, application Germany, Sept. 12, 1963, R 36,103
6 Claims. (Cl. 260—20)

ABSTRACT OF THE DISCLOSURE

The patent disclosed the following procedures for the preparation of modified alkyd resins:
(a) Carboxylic acids are esterified with polyhydric alcohols in such a manner as to form esters, bearing free hydroxyl groups,
(b) Reaction products of (a) are esterified with carboxylic acids in such a manner as to form esters, bearing free carboxylic groups,
(c) Reaction products of (b) are esterified with phenol-formaldehyde condensation products, which are reacted with a 1, 2 mono-epoxide prior to step c.

---

The present invention relates to a process for the preparation of new modified alkyl resins and to the resulting products which, in the form of coating compositions, possess greatly improved properties, such as greater hardness and better flexibility.

(1) The process for the preparation of modified alkyl resins is characterized in that (a) carboxylic acids having 5 to 22 carbon atoms and/or their anhydrides and/or their esters are reacted with polyalcohols having 2 to 6 hydroxyl groups to form partial polyalcohol-carboxylic acid-esters or ester mixtures;
(b) the reaction product is partially esterified by heating with carboxylic acids having 5 to 22 carbon atoms or their anhydrides and/or esters to form carboxyl bearing compounds; and
(c) these are thereafter esterified by heating to the desired acid number and/or viscosity with hydroxy-alkylated condensation products that were obtained by reacting phenol and/or alkylated phenols with aldehydes having 1 to 4 carbon atoms followed by hydroxyalkylation.

(2) A particularly advantageous way of carrying out the process of the present invention consists in hot or cold mixing in any desired sequence:

(a) carboxylic acids having 5 to 22 carbon atoms and/or their anhydrides and polyalcohols having 2 to 6 hydroxyl groups;
(b) carboxylic acids and/or their anhydrides and/or their esters;
(c) linear hydroxy-alkylated condensation products that were obtained by reacting phenol and/or alkylated phenols with aldehydes having 1 to 4 carbon atoms followed by hydroxy-alkylation, and thereupon esterifying the mixture by heating to the desired acid number and/or viscosity.

(3) Another equally advantageous way of carrying out the process of the present invention consists in hot or cold mixing in any desired sequence:

(a) partial polyalcohol-carboxylic acid-ester or ester mixtures obtained by reacting carboxylic acid esters having 5 to 22 carbon atoms in the carboxylic acid radical with polyalcohols having 2 to 6 hydroxyl groups, with the aid of catalysts, by heating and reesterifying, in the presence or absence of carboxylic acids having 5 to 22 carbon atoms;
(b) carboxylic acids having 5 to 22 carbon atoms and/or their anhydrides and/or their esters; and
(c) linear hydroxy-alkylated condensation products that were obtained by reacting phenol and/or alkylated phenols with aldehydes having 1 to 4 carbon atoms followed by hydroxy-alkylation, and thereafter esterifying the mixture by heating up to the desired acid number and/or viscosity.

The carboxylic acids having 5 to 22 carbon atoms that are suitable for the present invention, are mono- and/or polycarboxylic acids, their anhydrides and esters. These may be for example:

Saturated, unsaturated, straight-chained and branch-chained aliphatic, cycloaliphatic, aromatic and heterocyclic carboxylic acids and/or hydroxy-carboxylic acids and or amino-carboxylic acids, their anhydrides and esters separately or admixed. Examples of saturated carboxylic acids are: valeric acid, trimethyl-acetic acid, caproic acid, n-heptylic acid, caprylic acid, pelargonic acid, decanoic acid, lauric acid, myristic acid, palmitic acid, stearic acid, their anhydrides, their esters with short-chained alcohols, such as methanol or ethanol. As unsaturated acids it is possible to use: monomeric or polymeric oleic acid, linoleic acid, linolenic acid, castor oil fatty acid, or polymeric castor oil fatty acid, their anhydrides, their esters with short-chained alcohols, such as methanol or ethanol, examples of hydroxycarboxylic acids are:

Monomeric and polymeric ricinoleic acid, hydroxy-stearic acid, hydroxybenzoic acid, hydroxycinnamic acid, their anhydrides, their esters with short-chained alcohols, such as methanol or ethanol; as aromatic carboxylic acids there can be used: benzoic acid, phenylacetic acid, phenyl-propionic acid, their esters with short-chained alcohols, such as methanol or ethanol; as heterocyclic carboxylic acids there may be used: indolyl-acetic acid, pyridine carboxylic acids and the like; the amino-carboxylic acid may be: aminobenzoic acid, its anhydride, its esters with short-chained alcohols, such as methanol or ethanol.

As polybasic carboxylic acids, their anhydrides and esters it is possible to use:

Maleic acid, succinic acid, glutaric acid, phthalic acid, tetrahydrophthalic acid, hexahydrophthalic acid and their anhydrides, their partial esters or diesters with short-chained alcohols, fumaric acid, adipic acid, pimelic acid, suberic acid, azelaic acid, sebacic acid, isophthalic acid, terephthalic acid, pyromellitic acid, trimellitic acid, their partial esters or diesters with short-chained alcohols. It is preferable to use: maleic acid, maleic acid anhydride, fumaric acid, adipic acid, azelaic acid, phthalic acid, phthalic acid anhydride, isophthalic acid, trimellitic acid.

Satisfactory results are obtained by using carboxylic acids having 5–9 carbon atoms as well as hydroxystearic acid, stearic acid, ricinoleic acid, oleic acid, linoleic acid and linolenic acid or mixtures thereof. Particularly satisfactory results are obtained when lauric acid, myristic acid, palmitic acid and castor oil fatty acid are used. Instead of the monomeric fatty acids it is possible to use their polymers, such as dimers, trimers and tetramers, separately or in the form of their mixtures.

The carboxylic acids having 5–22 carbon atoms may be partially or totally replaced by their esters. Particularly suitable esters are: those derived from glycerin, from methyl, ethyl or propyl alcohols and from other lower aliphatic alcohols with the aforesaid carboxylic acids having 5–22 carbon atoms.

As the polyalcohols having 2–6 hydroxyl groups there can be used: aliphatic, cycloaliphatic alcohols having at least two reactive hydroxyl groups, such as ethylene glycol, 1.3-propylene glycol, 1.3-butylene glycol, 1.4-butylene glycol, glycerin, trimethylolethane, trimethylolpropane, pentaerythrite, sorbitol, neopentyl glycol, o-, m-, p-cyclohexanedimethanols and 3.3.5.5-tetrakis (hydroxymethyl) 4-hydroxytetrahydropyran.

As polyalcohols it has been found preferable to use: ethylene glycol, 1.2-propylene glycol, glycerin, trimethylolethane, trimethylolpropane and pentaerythrite.

Partial polyalcohol-carboxylic acid-esters suitable for the purposes of the present invention are esters that are formed by esterifying fatty acids having 5–22 carbon atoms or fatty acid mixtures with more than the equivalent quantity of di- and/or polyalcohols in such a way that the resulting partial esters contain at least one free alcoholic hydroxyl group. To be included are monoesters of di-, tri- and higher polyols, mono- and diesters of triols, mono-, di- and triesters of tetrols and, in like manner, of higher polyols, etc. Also to be included are dehydrated monoglycerides of natural and synthetic fatty acids as well as the epoxy-groups-carrying glycidyl esters of synthetic and natural fatty acids.

Although it is possible to prepare these partial polyalcohol esters by the reaction of free fatty acids with excess quantities of polyols, it is more convenient to effect the re-esterification of natural fatty acid triglycerides that occur in the form of vegetable and animal oils and fats with additional quantities of polyols for the production of the partial polyol-fatty acid esters. Thus, it is possible to form upon heating of oils or fats or the like fatty acid glycerides in the presence of a reesterification catalyst with the corresponding quantities of polyols, for example glycerin, trimethylolethane, trimethylolpropane, pentaerythrite, sorbitol or other polyols, mono-, di- or higher partial esters or mixtures thereof.

The partial polyalcohol-carboxylic acid esters must have the following properties in order to be suitable for further reaction in accordance with the invention: they must be soluble, liquid and meltable, in the cold or upon heating, in lower aliphatic alcohols or other solvents and must have at least one reactive alcoholic hydroxyl group. These reaction products are then partially esterified, upon heating, with carboxylic acids or their anhydrides and/or esters to form carboxylic groups-carrying reaction products.

The carboxyl groups-carrying reaction products must have the following properties: they must be soluble, liquid or meltable, in the cold or upon heating, in organic solvents and must have at least one reactive carboxyl group.

The term linear hydroxy-alkylated condensation products is here employed in its conventional meaning of reaction products that are obtained by reacting phenol and/or alkylated phenols with aldehydes having 1 to 4 carbon atoms followed by hydroxy-alkylation with saturated, unsaturated, aliphatic, aromatic monoepoxides, having aliphatic and/or aromatic radicals, which may also have ether or ester-like linkages, such as ethylene oxide, propylene oxide, butylene oxide, allylglycidyl ether, phenylglycidyl ether, styrene oxide, epoxy oleates (epoxymethyl oleate, epoxyethyl oleate) and glycidyl oleate. The hydroxy-alkylation is preferably carried out in the presence of basic catalysts.

As alkylated phenols are suitable: alkylated phenols having $C_1$ to $C_{12}$ in the alkyl chain, which may be straight or branched chains attached to the nucleus, as for example o-, m-, p-cresol or xylenols. Useful in the practice of this invention are dibutylphenol, octylphenol, dioctylphenol, nonylphenol, dodecylphenol; the preferred ones are p-cresol, o-cresol, n-butylphenol and p-tert.-butyl phenol.

As aldehydes having 1 to 4 carbon atoms it is possible to use: acetaldehyde, paracetaldehyde, propionaldehyde and butyraldehyde; preferred are formaldehyde, paraformaldehyde or other compounds that give off formaldehyde, such as hexamethylenetetramine.

The process for the preparation of the new modified alkyd resins is advantageously carried out by the stepwise procedure (1) as follows:

(a) The above-mentioned carboxylic acids having 5–22 carbon atoms and/or carboxylic acid anhydrides and/or esters are reacted with the polyalcohols having 2–6 hydroxyl groups, by heating them in definite proportions and for a period long enough to insure the formation of reaction products having the aforesaid properties. The reaction can be carried out in the presence or absence of inert solvents. It is preferred to operate in a melt system. The temperatures are made to conform to the particular reactants used. Suitable temperature ranges are between about 140 to 270° C.

When employing carboxylic acids as starting materials, the partial esterification can be carried out at 140° to 270° C. If the ester is to be reesterified with polyalcohols, the reaction therebetween is conveniently carried out at temperatures of the order of 220° to 270° C.

(b) The products obtained by the process according to (1a) are again subjected to partial esterification with carboxylic acids or their anhydrides and/or esters, by heating them in definite proportions and for a period long enough to insure that the reaction products are still capable of being dissolved, in the cold or upon heating, in an organic medium, are meltable or liquid and contain carboxyl groups that are still reactive.

It is also possible to have present hydroxyl and/or amino groups that are still reactive.

If monocarboxylic acids having 5–22 carbon atoms and/or their esters are selected in step (a), and these are mixed or reacted with polyalcohols having 2–6 carbon atoms to form partial polyalcoholcarboxylic acids or ester mixtures, it is necessary to mix or partially esterify in step (b) with dicarboxylic acids or with dicarboxylic acids and monocarboxylic acids, whereby the precaution must be taken that 50–100% equivalents of dicarboxylic acids and/or dicarboxylic acid esters and 0–50% equivalents of monocarboxylic acids and/or monocarboxylic acid esters are used in steps (a) and (b) based upon the total carboxylic acid equivalent and/or carboxylic acid ester equivalent. When approximately 100% equivalent of dicarboxylic acids and/or dicarboxylic acid esters is used in steps (a) and (b), the mixing and partial esterification is primarily carried out with polyalcohols having 2 hydroxyl groups. When 50% to 95% equivalent of dicarboxylic acids and/or their esters and 5 to 50% equivalent of monocarboxylic acids and/or their esters is used, the component consisting of polyalcohols having 2 hydroxyl groups can be supplemented with polyalcohols having 3–6 hydroxyl groups, preferably 3–4 hydroxyl groups, or completely replaced, up to 50% equivalent, with polyalcohols having 3–4 carbon atoms, in the case of diminished dicarboxylic acid or ester components. If tricarboxylic acids or their esters are employed up to 20% equivalent, it is necessary to have present up to about 20% equivalent of monocarboxylic acids with preferably a large component part of polyalcohol having only 2 hydroxyl groups. It is, of course, possible to use the carboxylic acids or their esters in steps (a) and (b) with varying quantities of mono-, di- or tricarboxylic acids when the carboxylic acid and/or ester equivalents corresponding to 50–100% equivalents of dicarboxylic acids and/or dicarboxylic acid esters and 0–50% equivalents of monocarboxylic acids and/or monocarboxylic acid esters, used with polyalcohols having 2–6 hydroxyl groups, supply in step (a) polyalcohol-carboxylic acid or ester mixtures possessing the above properties and in step (b) reaction products that carry carboxyl groups and are partially esterified with carboxylic acids and/or esters, that already possess the aforesaid properties.

When using natural oils or fats as starting materials for the reaction, which are reesterified in step (a) with polyalcohols, it is recommended to use primarily polyalcohols having 3–6 hydroxyl groups, preferably glycerin trimethylolpropane, trimethylolethane, pentaerythrite or mixtures thereof.

It is preferable to use in step (a) monocarboxylic acids having 5–22 carbon atoms, as for example mixtures of monocarboxylic acids having 5–9 carbon atoms, lauric acid, coconut first runnings fatty acid having 6–8 carbon atoms, fat acid fractions having 8–12 carbon atoms or mixtures thereof, linseed oil fatty acid, soya oil fatty acid, castor oil fatty acid, palmitic acid, stearic acid, cottonseed fatty acid and tall oil fatty acid or mixtures thereof. As methyl ester it is possible to use wood oil fatty acid methyl ester and/or the higher conjugated linseed oil fatty acid methyl ester, soya oil fatty acid methyl ester, cottonseed fatty acid methyl ester that are obtained by isomerization from natural linseed oil fatty acids, soya oil fatty acids and cottonseed fatty acids. As dimeric fatty acids are suitable the polymeric castor oil fatty acids. As dicarboxylic acids it is possible to use phthalic acid, adipic acid, sebacic acid and/or azelaic acid or mixtures thereof.

Particularly suitable are the natural vegetable oils and fats, in the form of their triglycerides, such as linseed oil, soya oil, sunflower oil, coconut fat and/or castor oil or mixtures thereof.

In step (b) it is preferred to use dicarboxylic acids for the reaction; however, monocarboxylic acids may also be present such as phthalic acid, phthalic acid anhydride, adipic acid, fumaric acid, maleic acid anhydride, benzoic acid, p-tert.-butylbenzoic acid, and the like.

(c) The hydroxy-alkylated condensation products to be added in the last reaction step, which are obtained by the reaction of phenol and/or alkylated phenols with aldehydes having 1–4 carbon atoms followed by hydroxy-alkylation, must still be capable of dissolving, hot or cold, in organic solvents, be fusible or liquid and still contain reactive alcoholic hydroxyl groups. It is preferred to use condensation products that are soluble in aromatic hydrocarbons, such as benzene, toluene and/or xylene.

The reaction products carrying hydroxyl groups from step (b) that are to be reacted in step (c) as well as the hydroxy-alkylation products carrying hydroxyl groups, must be chosen in such a way that the end products obtained in accordance with the invention can be dissolved hot or cold, are fusible or liquid.

In the preferred form of carrying out the present invention, the reaction of step (a) is effected by reesterification of 28–40% of castor oil or castor oil fatty acid, 15–25% trimethylolpropane and/or trimethylolethane and/or glycerin or mixtures of pentaerythrite and ethylene glycol at a temperature of 220–250° C. in the presence of a reesterification catalyst, so as to yield polyalcohol-carboxylic acid-esters that are soluble in solvents, preferably in ethanol. In step (b) these polyalcohol-carboxylic acid-esters are partially esterified with 20–40% phthalic acid anhydride and/or tetrahydrophthalic acid anhydride, to yield reaction products carrying carboxylic groups, which are then esterified in step (c) with 10–25% hydroxy-alkylated condensation products until the desired acid number of 5–35 and a viscosity of 50–350 DIN-sec., on the basis of 50% in xylene, is reached; the condensation products being obtained by reacting phenol and/or p-tert.-butylphenol with formaldehyde in a ratio of 1 equivalent of phenol to 0.7 of formaldehyde and/or 1 equivalent of p-tert.-butylphenol to 0.8 of formaldehyde in an alkaline medium, condensing with propylene oxide, also in an alkaline medium, and hydroxy-propylating upon the removal of water. For the reaction of the phenolic groups, it is recommended to use propylene oxide in an amount such that there will result for each phenolic equivalent 0.9–1.2 hydroxy-propylated groups.

The reaction products carrying carboxyl groups react, when they already have the aforesaid properties, with the hydroxy-alkylated condensation products at 180–250° C. and are thereby esterified. Products soluble in solvents having acid numbers from 2–35, with an average molecular weight from 800–2500, when 0.5–0.9, preferably 0.–0.8, carboxyl groups are reacted per alcoholic hydroxyl groups.

The following example is illustrative of a castor oil alkyd resin from the aforesaid group:

(a) 310 parts by weight of castor oil are heated to 180° C. in an inert gas atmosphere, in a flask equipped with a stirrer, a water separator and a thermometer, 0.05 part by weight of calcium acetate and 157 parts by weight of trimethylolpropane are added, heated to 225° C. and reesterified for about 1½ to 2 hours, until a sample in ethanol 1:10 is capable of clear dilution in the cold.

(b) 200 parts of hydroxy-alkylated phenol of the aforesaid type are now added and the esterification thereupon carried out up to 200° C. within 2 hours. The reaction is then completed at about 200° C. in a 94% xylene reflux with water separation until an acid number of 25 and a viscosity of 80–100 DIN-sec. is obtained.

A resin of this composition used as a binder by itself is resistant to yellowing. The coatings prepared therewith are capable of being punched and deep drawn; they also possess a good sterilization stability. It can be used as the sole binder in oven-dried in wrapping and film lacquers in the packaging industry. For this purpose the films can be baked at 120°–160° C. for 30 minutes. Moreover, it is possible to bake the resin in a mixture with aminoplasts, such as melamineformaldehyde resins etherified with butanol, in a 2:1 ratio, for 30 minutes at a temperature of 90° C. The coating obtained in this manner, aside from being resistant to chemicals, is scratch-resistant and promotes superior surface hardness. They can be used in the automobile industry as weather-resistant and non-yellowing lacquers that are superior to conventional castor oil alkyd lacquers with respect to great hardness, resistance to chemicals, non-yellowing characteristics and outstanding elasticity.

The hydroxy-alkylated condensation products are prepared in the following manner:

Phenol or alkylated phenols are reacted with aldehydes having 1–4 carbon atoms in an acid or alkaline medium, preferably in the presence of water, which must be present at least in the form of traces, while and upon suitable selection to yield linear condensation products.

In the alkaline range, the reaction may take place in the presence of water at about 25–150° C. A reaction temperature of 50–100° C. is preferred. In an acid medium, it is necessary to use higher reaction temperatures, for example about 50 to 200° C. It is preferred to use reaction temperatures of 90–130° C.

The hydroxy-alkylation is carried out in the following manner:

The condensation products that are obtained by the reaction of phenol or alkylated phenols with aldehydes having 1–4 carbon atoms are reacted in a second step by themselves or with varying amounts of monoepoxides, such as ethylene oxide, propylene oxide, butylene oxide, allylglycidyl ether, phenylglycidyl ether styrene oxide, epoxy oleates (epoxymethyloleate, epoxyethyloleate) and glycidyloleate in the presence of basic catalysts at raised temperatures, if necessary under pressure, in the presence or absence of inert solvents in liquid phase or melt.

As monoepoxides it is preferred to use ethylene oxide and propylene oxide. A preferred manner of carrying out the reaction is to react phenol and/or alkylated phenols with aldehydes having 1–4 carbon atoms and equivalent quantities of monoepoxides. In the case of more volatile monoepoxides it is recommended to use an excess thereof up to 50%, preferably 30%.

As the basic catalysts it is possible to use; lye, ammonia, primary-, secondary-, tertiary amines, quaternary ammonium salts, pyridine and other heterocyclic bases. It is preferred to use ammonia, tertiary amines and quaternary ammonium salts.

The reaction temperatures lie between 40° and 200° C. The preferred temperature range is from 80–150° C. In the case of low-boiling monoepoxides the temperature is raised by operating under pressure, thereby speeding up the hydroxy-alkylation reaction. The condensation products initially caused to react and the condensation products obtained after the hydroxy-alkylation must be liquid or fusible and soluble in organic solvents.

After the addition of the linear hydroxy-alkylated condensation products, which were obtained by the reaction of phenol and/or alkylated phenols with aldehydes having 1–4 carbon atoms followed by hydroxy-alkylation, the esterification is carried out by heating from 160° to 270° C., preferably from 200° to 230° C., until the desired acid number of about 2 to 40 and/or viscosity has been obtained. The finished reaction products should have molecular weights from about 500–4000. The preferred molecular weights are from 1000–2500.

Examples of the preparation of hydroxy-alkylated phenols:

(A) In a flask equipped with a stirrer, thermometer and reflux condenser, are heated

| | Parts by weight |
|---|---|
| p-Tert.-butylphenol | 450 |
| Formaldehyde, 30% | 480 |
| Soda lye, 40% | 95 |

Under an atmosphere of nitrogen and at a temperature of 50° C. until the whole is dissolved, whereupon further—

450 parts by weight of p-tert.-butylphenol are added while at the same time increasing the temperature to 70° C. and holding it at this level for 30 minutes. The solution is now mixed with

| | |
|---|---|
| Water ml | 250 |
| Sulfuric acid parts by weight | 65 | while continuously stirring. The aqueous phase is separated and the supernatent solution is washed twice each time with 450 ml. of water, while still stirring, until the last aqueous phase as a pH value of 5 to 7. The remaining water and traces of p-tert.-butylphenol are then removed by distillation until a resin sample dissolved to the extent of 60% in toluene, had a Gardner-viscosity at 20° C. of G-K. Upon cooling to 100° C. the resin is diluted with

| | Ml. |
|---|---|
| Toluene | 400 |
| Triethylamine | 40 | and at 80° C. it is desirable to start adding 390 parts by weight of propylene oxide within a 3 hour period. The temperature of the reaction mixture is slowly raised, while refluxing, up to 106° C. (in about 8 hours). After the hydroxy-alkylation, there are added while continuously stirring 400 parts by weight of 10% soda lye whereupon the aqueous alkaline solution is separated and the resin solution washed two more times, each time with 400 ml. of hot water followed by separation of the washwater. A small amount of toluene or methanol can be used to facilitate the separation. The resin solution is then concentrated in a vacuum and at a temperature as high as 200° C., in order to remove the volatile constituents. A sample of the product had a viscosity of 30–60 DIN-sec. when dissolved in toluene to the extent of 60%. The melting point lies between 55–65° C. The product prepared in this manner is ready for use.

The reaction products obtained in accordance with Example A may be represented by the following formula:

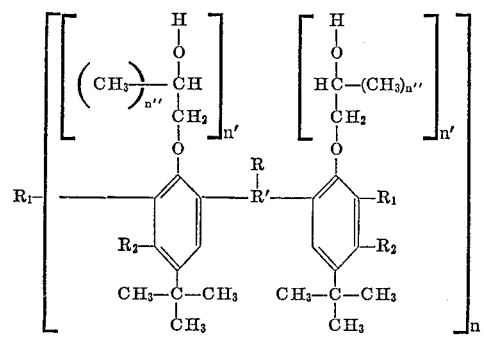

wherein
$n = 1–6$, preferably 1–3
$n' = 1–18$, preferably 1–2
$R = H$
$R' = CH$ and/or $CH_2—O—CH_2$
$R_1 =$ in the linear chain $CH_2$ or $CH_2—O—CH_2$; in terminal position $= H$ or $CH_2OH$
$R_2 = H$ If ethylene oxide is used in place of propylene oxide, then $n'' = H$.

(B) In a flask of the type described at A are introduced

| | Parts by weight |
|---|---|
| Phenol | 940 |
| Formaldehyde, 30% | 590 |
| Oxalic acid | 9 | and after refluxing for 5 hours and distilling off water and a small quantity of phenol, and operating in a vacuum at a temperature up to 160° C., there is obtained a resin having melting point of 50 to 60° C. After dissolving the resin in

| | Ml. |
|---|---|
| Methylisobutylketone | 400 |
| Triethylamine | 50 | it is desirable to start at 80° C. with the addition of 660 parts by weight of propylene oxide while continuously refluxing. The introduction of propylene oxide, at a constant temperature, is terminated after about 3 hours. The temperature of the resin solution is then gradually raised to 105° C. within a period of 8 hours and under diminished reflux. After this, the hydroxy-alkylation is finished. Upon distilling off the volatile constituents in a vacuum of 60 mm. and up to 200° C. there is obtained a hydroxy-alkylated product that is ready for use.

The new linear hydroxy-alkylated condensation products that are obtained by the reaction of phenol and/or alkylated phenols with aldehydes having 1–4 carbon atoms followed by hydroxy-alkylation, are suitable as wetting agents and/or as emulsifier additives.

The hydroxy-alkylation products with a short hydroxy-alkyl chain are fat-and-oil-soluble, whereas the long-chained products are water-soluble. Moreover, it is possible to react the hydroxy-alkylation products with diisocyanates or epoxy resins, in the cold or by applying heat, to obtain cross-linked products. The alkyd resins modified in accordance with the present invention are prepared by the above described method 2 wherein (a) Carboxylic acids having 5–22 carbon atoms and/or their anhydrides and polyalcohols;

(b) Carboxylic acids and/or their anhydrides and/or their esters;

(c) Linear hydroxy-alkylated condensation products, that are obtained by reacting phenol and/or alkylated phenols with aldehydes having 1–4 carbon atoms, followed by hydroxy-alkylation, are mixed, hot or cold, in any desired sequence and the mixture is thereupon esterified by heating until the desired acid number and/or viscosity has been obtained. It is possible to use the same relative proportions as well as equivalents of monocarboxylic acids and their esters to dicarboxylic acids and/or anhydrides and/or esters. The same conditions are applicable also in this case, namely for each hydroxyl group 0.5–0.9, preferably 0.6–0.8, carboxyl groups. Aside from the use of esters of mono- and dicarboxylic acids, the same reaction temperatures as in method 1 can be applied. Also, it is recommended that the compounds to be reacted be always selected in such a way that the resulting products, in accordance with the present invention, possess the above-described properties.

If it is preferred to operate in accordance with method 3, as set forth above, wherein (a) Partial polyalcohol-carboxylic acid-esters or ester mixtures, that are obtained by the reaction of carboxylic acid esters having 5–22 carbon atoms in the carboxylic acid radical, with polyalcohols by means of catalysts and upon heating by esterification in the presence or absence of carboxylic acids having 5–22 carbon atoms;

(b) Carboxylic acids having 5–22 carbon atoms and/or their anhydrides and/or their esters;

(c) Linear hydroxy-alkylated condensation products that are obtained by the reaction of phenol and/or alkylated phenols with aldehydes having 1–4 carbon atoms, followed by hydroxy-alkylation, are mixed, hot or cold, in any desired sequence and are esterified by heating to the desired acid number and/or viscosity, it is to be understood that the principles applied in methods 1 and 2, with respect to the selection of reactants and the procedure to be followed, are also applicable in this case.

PREPARATION OF ALKYD RESINS

Example 1 according to Method 1

In a flask provided with a stirrer, thermometer, reflux condenser and water separator, and under an atmosphere of nitrogen:

(a) 310 parts by weight of a synthetic fatty acid mixture having 5–9 carbon atoms and an average acid number of 372 and an iodine number of 4 are reacted with 130 parts by weight of trimethylolpropane, with separation of water at a temperature up to 180° C., to form the partial polyalcohol-carboxylic acid-ester;

(b) This is then partially esterified at 180° C. with 160 parts by weight of adipic acid to form compounds carrying carboxyl groups; and (c) Upon addition of 500 parts by weight of the hydroxy-alkylated condensation product obtained according to Example A, the whole is esterified to the extent of 60% in xylene by heating to 230° C. within about 15 hours, to an acid number of about 21 and a viscosity of 80–120 DIN-sec.

Resins having this composition admixed with ureamelamineformaldehyde resins that were etherified with butanol in a ratio of 3:1, 2:1 and 4:1 can be baked at 120° C. to yield excellently adhering coatings which are resistant to chemicals and are superior to resins devoid of hydroxy-alkylated condensation products.

The same esterification equipment is used in the following examples.

Example 2 according to Method 1

(a) 450 parts by weight of linseed oil, 50 parts by weight of linseed oil fatty acid and 0.05 part by weight of calcium acetate are heated to 255° C. whereupon 105 parts by weight of pentaerythrite are added. Partial polyalcohol-carboxylic acid-esters are obtained after approximately 2 hours.

(b) After cooling to 180° C., 0.5 part by weight of triphenyl phosphite and 215 parts by weight of phthalic acid anhydride are partially esterified at this temperature to compounds having carboxyl groups, and thereupon (c) 170 parts by weight of the hydroxy-alkylated condensation product of Example A are esterified to the extent of 40% in test benzine by gradually heating up to 230° C., refluxing 97% with the aid of xylene and with separation of water, to an acid number of about 10 and a viscosity of 60–100 DIN-sec. Resins of this composition used with siccatives yield excellently drying coatings which are distinguished from resins devoid of hydroxy-alkylated condensation resins by greater surface hardness, better resistance to chemicals and better adhesion to metals.

Example 3 according to Method 1

(a) 305 parts by weight of coconut fat and 0.05 part by weight of calcium acetate are heated to 180° C. whereupon 65 parts by weight of glycerin are added and reesterified at 255° C. for about 2 hours at a constant temperature until partial polyalcoholcarboxyl acid-esters are formed.

(b) after cooling to 180° C., 0.5 part by weight of triphenyl phosphite, 370 parts by weight of phthalic acid anhydride and 125 parts by weight of glycerin are partially esterified at this temperature for 1 hour, and thereupon (c) 150 parts by weight of the hydroxy-alkylated condensation product of Example A, the whole is esterified to the extent of 50% in xylene by gradually heating to 220° C., refluxing 96% with the aid of xylene and with separation of water, to an acid number of about 5 and a viscosity of 200–350 DIN-sec.

Resins of this composition admixed with ureamelamine formaldehyde resins etherified with butanol in a ratio of 2:1 and 3:1 can be baked at 120° C. to yield excellently adhering coatings having great surface hardness, better resistance to chemicals and better elasticity than resins that do not contain hydroxy-alkylated condensation products.

Example 4 according to Method 2

(a) 300 parts by weight of a synthetic fatty acid mixture having 7–9 carbon atoms and an average acid number of 400 and an iodine number of 4 and 130 parts by weight of trimethylpropane, (b) 160 parts by weight of adipic acid, and (c) 500 parts by weight of the hydroxy-alkylated condensation product of Example A are esterified to the extent of 60% in xylene by heating at 230° C., with separation of water, within about 15–20 hours to an acid number of approximately 20 and a viscosity of 80–120 DIN-sec.

The properties of the resin are the same as those mentioned in Example 1.

Example 5 according to Method 2

(a) 650 parts by weight of tall oil fatty acid having an acid number of 190 and an iodine number of 135 and 170 parts by weight of pentaerythrite, (b) 180 parts by weight of phthalic acid anhydride, and (c) 100 parts by weight of the hydroxy-alkylated condensation product of Example A are esterified by eating up to 230° C., with separation of water, for about 20 hours to an acid number of approximately 12.

Example 6 according to Method 2

(a) 310 parts by weight of a fatty acid mixture having $C_5$–$C_9$ carbon atoms, an average acid number of 372 and an iodine number of 4, and 130 parts by weight of trimethylol-propane, (b) 160 parts by weight of adipic acid, and (c) 500 parts by weight of the hydroxy-alkylated condensation product of Example A are esterified by heating up to 230° C., with separation of water, within about 15 hours to an acid number of approximately 20.

The properties of the resin are the same as those mentioned in connection with Example 1.

Example 7 according to Method 3

(a) 320 parts by weight of caster oil and 0.05 part by weight of calcium acetate are heated to 180° C., whereupon 160 parts by weight of trimethylolpropane are added and reesterified at 255° C. for about 2 hours at the same temperature until partial polyalcohol-carboxylic acid esters are formed, (b) After cooling to 180° C., there are added 0.5 part by weight of triphenylphosphite, 315 parts by weight of phthalic acid anhydride, 45 parts by weight of trimethylolpropane, and (c) 150 parts by weight of the hydroxy-alkylated condensation product of Example A, the whole being then esterified in xylene to the extent of 50% by gradually raising the temperature to 190° C. and thereafter refluxing to the extent of 92% in xylene, with separation of water, for 6–8 hours up to about 200° C. until an acid number of about 25 and a viscosity of about 100–150 DIN-sec. are obtained.

A resin of this composition used as a binder by itself was found to be more resistant to yellowing than commercial castor oil alkyd resins having approximately the same oil content. It is capable of being punched and deep-drawn. It has excellent resistance to sterilization. It can be used as the sole binder for oven-dried wrapper and film lacquers used in the packaging industry. The films used for this purpose can be baked at 120°–160° C. for 30 minutes. Moreover, it is possible to bake the resin in a mixture with aminoplasts, such as melamine-formaldehyde resins etherified with butanol, in a ratio of 2:1 at 90° C. for 30 minutes. The coatings obtained therefrom, aside from being resistant to chemical influences, are scratch resistant and very hard. They are eminently suitable for use as weatherproof and non-yellowing automobile lacquers that are superior to conventional castor oil-alkyd resins from the standpoint of their resistance to discoloration and elasticity.

Example 8 according to Method 3

(a) 320 parts by weight of castor oil and 0.05 part by weight of calcium acetate are heated to 180° C., whereupon 160 parts by weight of trimethylpropane are added and esterified at 255° C. for 2 hours at the same temperature until partial polyalcohol-carboxylic acid esters are formed.

(b) After cooling to 180° C., there are added 0.5 part by weight of triphenyl phosphite, 315 parts by weight of tetrahydrophthalic acid anhydride, 50 parts by weight of trimethylolpropane and 110 parts by weight of the hydroxy-alkylated condensation product of Example B, the whole being then heated to 190° C. by gradually raising the temperature and thereafter esterified by refluxing to the extent of 92% in xylene with separation of water within 6–8 hours at about 200° C. to an acid number of approximately 25.

The properties of this resin are the same as those mentioned in connection with Example 7. It offers the additional advantage of having a very high gloss and, if anything, a better resistance to yellowing.

What is claimed is:

1. A process for the preparation of modified alkyd resins which comprises (a) preparing an ester bearing free hydroxyl groups, by partial esterification at a temperature ranging from about 140° C. to about 270° C. of at least one member of a group consisting of monocarboxylic acids having 5–22 carbon atoms and their polyhydric alcohol esters with polyhydric alcohols, (b) partially esterifying said ester with at least one member of a group consisting of dicarboxylic acids having 5–22 carbon atoms and their anhydrides, thus forming a compound having free carboxylic acid groups, (c) esterifying said compound at a temperature ranging from about 160° C. to about 270° C. until an acid number ranging from about 40 to about 2 and a viscosity of about 60 to about 350 DIN/sec. has been reached with a condensation product soluble in an organic solvent and obtained by reacting at a temperature ranging from about 50 to about 200° C. at least one member of a group consisting of phenol and alkylated phenols having from 1–12 carbon atoms in the alkyl chain with aldehydes having 1–4 carbon atoms, said condensation product prior to its use in step (c) being hydroxylated by reacting it at a temperature ranging from about 40° C. to about 200° C. with a mono-epoxide selected from a group consisting of ethylene oxide, propylene oxide, butylene oxide, allylglycidyl ether, phenylglycidyl ether, styrene oxide, epoxy oleates and glycidyl oleate.

2. A process for the preparation of modified alkyd resins which comprises mixing (a) an ester bearing free hydroxyl groups obtained by partially esterifying at a temperature ranging from about 140° C. to about 270° C. monocarboxylic acids having 5–22 carbon atoms with polyhydric alcohols (b) at least one member of a group consisting of dicarboxylic acids having 5–22 carbon atoms, their anhydrides and their monohydric alcohol and polyhydric alcohol esters, (c) a condensation product soluble in an organic solvent and obtained by reacting at a temperature ranging from about 50 to about 200° C. at least one member of a group consisting of phenols and alkylated phenols having from 1–12 carbon atoms in the alkyl chain with an aldehyde having 1–4 carbon atoms, said condensation product being hydroxyalkylated by reacting at a temperature ranging from about 40° C. to about 200° C. with a mono-epoxide selected from a group consisting of ethylene oxide, propylene oxide, butylene oxide, allylglycidyl ether, phenylglycidyl ether, styrene oxide, epoxy oleates and glycidyl oleate and thereupon esterifying said mixture at a temperature ranging from about 160° C. to about 270° C. until an acid value ranging from about 40 to about 2 and a viscosity ranging from about 60 to about 350 DIN/sec. has been reached.

3. A process for the preparation of modified alkyd resins which comprises mixing (a) a polyhydric alcohol monocarboxylic acid ester, bearing free hydroxyl groups, obtained by transesterification in presence of a transesterification catalyst of carboxylic acid esters having 5–22 carbon atoms with polyhydric alcohols at a temperature ranging from about 220° C. to about 250° C., (b) at least one member of a group consisting of dicarboxylic acids having 5–22 carbon atoms, their anhydrides and their monohydric alcohol and polyhydric alcohol esters, (c) a condensation product soluble in an organic solvent and obtained by reacting at a temperature ranging from about 50 to about 200° C. at least one member of a group consisting of phenols and alkylated phenols having from 1–12 carbon atoms in the alkyl chain with an aldehyde having 1–4 carbon atoms, said condensation product being hydroxyalkylated by reacting it at a temperature ranging from about 40° C. to about 200° C. with a mono-epoxide selected from a group consisting of ethylene oxide, propylene oxide, butylene oxide, allylglycidyl ether, phenylglycidyl ether, styrene oxide, epoxy oleates and glycidyl oleate and thereupon esterifying said mixture at a temperature ranging from about 160° C. to about 270° C. until an acid value ranging from about 40 to about 2 and a viscosity ranging from about 60 to about 350 min./sec. has been reached.

4. A process as set forth in claim 2 wherein the mixing operation is carried out up to a temperature of about 180° C.

5. A process as set forth in claim 2 wherein the mixing operation is carried out at room temperature.

6. A product produced in accordance with the process of claim 2.

References Cited

UNITED STATES PATENTS

| | | | |
|---|---|---|---|
| 1,867,583 | 7/1932 | Moore et al. | 260—20 |
| 1,867,584 | 7/1932 | Moore et al. | 260—20 |
| 2,310,935 | 2/1943 | Carlton et al. | 260—20 |
| 2,337,873 | 12/1943 | D'Alelio | 260—20 |
| 2,626,249 | 1/1953 | Honel | 260—20 |
| 2,981,703 | 4/1961 | Hoenel | 260—20 |

FOREIGN PATENTS

| | | |
|---|---|---|
| 1,094,899 | 12/1960 | Germany. |
| 431,951 | 7/1935 | Great Britain. |
| 499,065 | 1/1939 | Great Britain. |
| 665,195 | 1/1965 | Great Britain. |

OTHER REFERENCES

Chemical Abstracts, vol. 33, p. 1163 (Feb. 10, 1959), copy available in Scientific Library.

DONALD E. CZAJA, *Primary Examiner.*

F. McKELVEY, W. E. PARKER, *Assistant Examiners.*